United States Patent [19]

Nishiura

[11] Patent Number: 4,863,273

[45] Date of Patent: Sep. 5, 1989

[54] D.C. COMPONENT CONTROLLED FIBER OPTIC GYROSCOPE

[75] Inventor: Yozo Nishiura, Osaka, Japan

[73] Assignee: Itaru Todoriki, Director-General, Agency of Industrial Science and Technology, Tokyo, Japan

[21] Appl. No.: 809,813

[22] Filed: Dec. 17, 1985

[30] Foreign Application Priority Data

Dec. 21, 1984 [JP] Japan .................................. 59-268234

[51] Int. Cl.$^4$ ................................................ G01B 9/02
[52] U.S. Cl. ................................................ 356/350
[58] Field of Search ........................... 356/350; 372/31

[56] References Cited

U.S. PATENT DOCUMENTS

| | | | |
|---|---|---|---|
| 4,181,901 | 1/1980 | Heyke | 372/31 |
| 4,219,276 | 8/1980 | Dorsman | 356/350 |
| 4,299,490 | 11/1981 | Cahill et al. | 356/350 |

FOREIGN PATENT DOCUMENTS

| | | | |
|---|---|---|---|
| 0075707 | 4/1983 | European Pat. Off. | 356/350 |
| 58-219404 | 12/1983 | Japan . | |
| 59-63513 | 4/1984 | Japan . | |
| 2108652 | 5/1983 | United Kingdom . | |

OTHER PUBLICATIONS

"Fiber-Optic Rotation Sensing with Low Drift", Optics Letters, Ulrich, 5-1980, pp. 173-175.

*Primary Examiner*—Vincent P. McGraw
*Assistant Examiner*—S. A. Turner
*Attorney, Agent, or Firm*—Sughrue, Mion, Zinn, Macpeak & Seas

[57] ABSTRACT

A phase modulation type fiber optic gyroscope having a greatly improved output stability without a large increase in the number of basic components of the gyroscope system. In accordance with the invention, the d.c. component of the output of a light detecting element which provides the two circulating beams is sensed and employed to control the output of the light-emitting element so as to be constant.

3 Claims, 2 Drawing Sheets

D.C. COMPONENT CONTROLLED FIBER OPTIC GYROSCOPE

BACKGROUND OF THE INVENTION

The present invention relates to a fiber optic gyroscope, and more particularly to a phase modulation fiber optic gyroscope.

Gyroscopes are commonly used for angular velocity sensors for navigational purposes and, for instance, controlling the attitude, etc., of an aircraft or spacecraft. Gyroscopes can also be used for controlling automobiles, robots, etc. A gyroscope allows accurate determination of not only the angular velocity, but also can provide directional data by integrating the former.

A fiber optic gyroscope can be made compact in size because it has no moving parts. Moreover, the fiber optic gyroscope is of especial current interest because it is superior to conventional gyroscopes in characteristics of minimum detectable angular velocity (sensitivity), drift, measurable range (dynamic range), and scale factor stability.

Examples of fiber optic gyroscopes have been described, for instance, by T. G. Giallorenzi and J. A. Bucaro, "Optical Fiber Sensor Technology", IEEE J. of Quantum Electronics, E-18, No. 4, pp. 626–662 (1982); Culshaw and I. P. Giles, "Fiber Optic Gyroscopes", J. Phys. E: Sci. Instrum., 16, pp. 5–15 (1983); and O. Tsubokawa, "Fiber Optic Gyroscope", Study of Lasers, 11, No. 12, pp. 880–902 (1983).

Referring to FIG. 2, the basic principles of a fiber optic gyroscope will be described.

Light received from a luminous element 10 is split by a beam splitter 12 and then inputted to both ends of an optical fiber loop or a sensor coil 20, formed by winding a single mode optical fiber 18 a number of times in the form of a coil, to propagate beams through the sensor coil 20 both clockwise and counterclockwise. If the sensor coil 20 is turning at an angular velocity of $\Omega$, there occurs a phase difference of $\Delta\theta$ between the clockwise and counterclockwise beams. The angular velocity $\Omega$ is detected by measuring $\Delta\theta$.

The intensity of the electric fields of the beams propagating through the sensor coil 20 clockwise and counterclockwise are represented as follows:

$$E_r = E_1 \sin(\omega t + \Delta\theta/2)$$

$$E_l = E_2 \sin(\omega t - \Delta\theta/2)$$

where $E_1$ and $E_2$ = amplitudes of the counterclockwise and clockwise beams, respectively; $\omega$ = angular frequency of the beam; $t$ = time; and $\Delta\theta$ = phase difference as determined according to the Sagnac effect.

The counterclockwise and clockwise beams with the phase difference $\Delta\theta$ therebetween are synthesized by the beam splitter 12 and made incident on the light detecting element 26. The phase difference $\Delta\theta$ is detected from the intensities sensed by the light detecting element 26. The phase difference $\Delta\theta$ can be expressed by:

$$\Delta\theta = (4\pi La/c\lambda) \cdot \Omega \quad (1)$$

where L = length of the sensor coil fiber, a = radius of the sensor coil, c = velocity of beam under vacuum, $\lambda$ = optical wavelength, and $\Omega$ = rotational angular velocity. This is called the Sagnac effect.

Various methods of detecting the phase difference $\Delta\theta$ have been proposed. If it is attempted to obtain the sum of the counterclockwise and clockwise beams by means of the light detecting element and square-law detection, the output I is formed as follows:

$$I\alpha\{1 + \cos(\Delta\theta)\} \quad (2)$$

This approach, however, is disadvantageous in that the sensitivity is poor when $\Delta\theta$ is close to 0 due to the factor of $\cos(\Delta\theta)$.

Consequently, there has been proposed an optical mechanism wherein the phase of either counterclockwise or clockwise beam is 90° shifted and subjected to square-law detection. In that case, the output I becomes:

$$I\alpha\{1 + \sin(\Delta\theta)\}. \quad (3)$$

Thus, the sensitivity will be improved when $\Delta\theta$ is closer to 0.

However, using this approach, an additional three beam splitters are required to separate the optical paths and thus separate the beams from each other, and also the lengths of the separate optical path must be equal to each other. Therefore, there are difficulties in improving the sensitivity when $\Delta\theta$ is close to 0 using the aforementioned static optical detection mechanism.

Various types of fiber optic gyroscopes, specifically, phase modulation and frequency modulation fiber optic gyroscopes, have been proposed wherein dynamic mechanisms are employed to detect $\Delta\theta$. A phase modulation type fiber optic gyroscope surpasses others in terms of the minimum detectable angular velocity.

The phase modulation fiber optic gyroscope is designed to detect the phase difference of $\Delta\theta$ by providing a phase modulating element at one end of an optical fiber sensor coil and measuring the intensity of the modulating signal. Referring to FIG. 3, the phase modulation fiber optic gyroscope will be described.

Light capable of interference and received from a luminous element 10 is split into two parts by a beam splitter 12, and the light thus split is introduced to both ends of an optical fiber 18 through coupling lenses 14 and 16. The optical fiber 18 is divided into two portions: one wherein it is wound so as to form a sensor coil 20 and the other 24 wherein it is wound on a phase modulating element 22 such as a piezoelectric element driven at an angular frequency of $\omega_m$. The beams coupled to respective ends of the optical fiber are propagated through the optical fiber sensor coil 20 clockwise and counterclockwise, emitted from opposite ends thereof, combined by the beam splitter 12, and made incident on a light detecting element 26.

If the positions of the phase modulating element and the sensor coil are arranged asymmetrically, the modulation times will be different from each other although the beams simultaneously emitted from the luminous element are respectively caused to pass through the sensor coil and phase modulating element portions clockwise and counterclockwise. When the output is processed using square-law detection with the light detecting element, the modulating signal will appear in the output. Since $\Delta\theta$ is contained in the amplitude of the modulating signal, $\Delta\theta$ can be obtained based on the intensity of the modulating signal, which is known.

It is assumed the phase modulator is placed close to the end on which the counterclockwise beam is incident. Given L=the length of the optical fiber sensor coil, n=the reflective index of the fiber core, and the c=the beam velocity, the time $\tau$ required for the beam to pass through the sensor coil is:

$$\tau = nL/c \tag{4}$$

The modulating signal is, as aforementioned, assumed a sine wave having an angular frequency of $\omega_m$. The light emitted from the luminous element is split into beams propagating clockwise and counterclockwise, and the phase difference $\phi$ of the modulating signal when each beam is subjected to phase modulation is:

$$\begin{aligned}\phi &= \omega_m \tau \\ &= nL\omega_m/c \\ &= 2\pi f_m nL/c\end{aligned} \tag{5}$$

where $\omega_m = 2\pi f_m$.

Due to the Sagnac effect, there is a phase difference of $\pm \Delta\theta/2$ between the clockwise and counterclockwise beams, and the phase is further modulated by the phase modulating element. Given b=the amplitude of the phase modulating element, the intensities $E_r$ and $E_l$ of the electric fields of the clockwise and counterclockwise beams are given by:

$$E_r = E_1 \sin\{\omega t + \Delta\theta/2 + b \cdot \sin(\omega_m t + \phi)\} \tag{6}$$

$$E_l = E_2 \sin\{ft - \Delta\theta/2 + b \cdot \sin(\omega_m t + \omega)\} \tag{7}$$

The clockwise and counterclockwise beams having these intensities of electric fields are combined by the beam splitter 12 and processed with square-law detection by the light detecting element 26. Thus the output $S(\Delta\theta,t)$ of the light detecting element is made proportional to the product obtained by squaring the sum of $E_r$ and $E_l$.

$$S(\Delta\theta,t) = \{E_r + E_l\}^2 \tag{8}$$

From equation (8):

$$S(\Delta\theta,t) = E_1 E_2 \cdot \cos\{\Delta\theta + 2b \cdot \sin(\phi/2) \cdot \cos(\omega_m t + \phi/2)\} + D.C. + \{2\omega \text{ or more}\} \tag{9}$$

where D.C. designates a d.c. component, and $\{2\omega \text{ or more}\}$ indicates components at least twice as high in angular frequency as the the light signal. Since that value is not detected by detector, however, it is taken as 0.

Thus, $\Delta\theta$ is obtained from its relation to the modulating signal because of the phase difference $\phi$ effected by the phase modulating element.

The term $S(\Delta\theta,t)$ can be expanded in a geometric progression using Bessel functions (omitting the D.C. component) as:

$$S(\Delta\theta,t) = E_1 E_2 \cdot [\cos(\Delta\theta) \cdot \cos\{2b \cdot \sin(\phi/2) \cdot \cos(\omega_m t + \phi/2)\} - \sin(\Delta\theta) \cdot \sin\{2b \cdot \sin(\phi/2) \cdot \cos(\omega_m t + \phi/2)\}] \tag{10}$$

From general Bessel function theory:

$$e^{(x/2)(t - 1/t)} = \sum_{n=-\infty}^{\infty} J_n(x) t^n \tag{11}$$

Substituting $t = e^{i\theta}$, $$e^{ix \cdot \sin\theta} = \sum_{n=-\infty}^{\infty} J_n(x) e^{ni\theta} \tag{12}$$

By expanding the real and imaginary parts of equation (12) and employing a series expansion of cos and sin terms, portions of equation (10) are obtained.

Provided $$S(\Delta\theta,t) = \{S_c \cdot \cos(\Delta\theta) + S_s \cdot \sin(\Delta\theta)\} \cdot E_1 E_2, \tag{13}$$

$$J_{-n}(x) = (-1)^n J_n(x) \tag{14}$$

after $\theta$ is converted into $\theta + \pi/2$.

However, if $S_c$ and $S_s$ are written by using the fact that n is a positive number and assuming $$\xi = 2b \cdot \sin(\phi/2), \tag{15}$$

then:

$$S_c = J_0(\xi) + 2 \sum_{n=1}^{\infty} (-1)^n J_{2n}(\xi) \cdot \cos(2n\omega_m t) \tag{16}$$

and $$S_s = 2 \sum_{n=0}^{\infty} (-1)^n J_{2n+1}(\xi) \cdot \cos\{(2n+1)\omega_m t\} \tag{17}$$

Hence, $S(\Delta\theta,t)$ can be expressed by:

$$S(\Delta\theta,t) = (\tfrac{1}{2})(E_1^2 + E_2^2) + \{\text{components above } 2\omega\} + \tag{10'}$$

$$E_1 E_2 J_0(\xi) \cdot \cos(\Delta\theta) + E_1 E_2 \cdot 2 \sum_{n=1}^{\infty} (-1)^n J_{2n}(\xi) \cdot \cos(2n\omega_m t) \cdot$$

$$\cos(\Delta\theta) + E_1 E_2 \cdot 2 \sum_{n=0}^{\infty} (-1)^n J_{2n+1}(\xi) \cdot \cos\{2n+1)\omega_m t\} \cdot$$

$$\sin(\Delta\theta) = \{D.C. \text{ component}\} +$$

$$2E_1 E_2 \cdot J_1(\xi) \cdot \cos(\omega_m t) \cdot \sin(\Delta\theta) - 2E_1 E_2 \cdot \tag{10''}$$

$$J_2(\xi) \cdot \cos(2\omega_m t) \cdot \cos(\Delta\theta) + \{\text{components of higher order}\}$$

This represents the sum of the series of the fundamental wave of the modulating signal $\omega_m$ and the high frequency signal.

If a suitable filter is used, the fundamental wave $\omega_m$ or a higher harmonic signal of any order can be extracted. Even if such a signal is employed, $\cos(\Delta\theta)$ or $\sin(\Delta\theta)$ can be determined. In such a case, the modulation factor imposed by the phase modulating element, the modulation signal angular frequency $\omega_m$, and the length of time $\tau$ for the beam to pass through the sensor coil should be set so that the value of the Bessel function $J_n(\xi)$ of the appropriate order is large.

The highest sensitivity is represented by the first term (n=0) of equation (17), i.e., the second term on the right-hand side of equation (10), which term corresponds to the fundamental wave component.

Assuming the fundamental wave is $P(\Delta\theta,t)$, $$P(\Delta\theta,t) = 2E_1 E_2 \cdot J_1(\xi) \cdot \cos(\omega_m t) \cdot \sin(\Delta\theta) \tag{18}$$

Accordingly, an output proportional to $\sin(\Delta\theta)$ is obtained, $\Delta\theta$ being obtained from the amplitude of the fundamental wave component.

Moreover, the sensitivity can be further improved if the term $\Delta\theta$ in equation (18) is set to maximize $J_1(\xi)$. The Bessel function $J_1(\xi)$, i.e., the first order term, will be a maximum when $\xi=1.8$. The d.c. component $J_0(\xi)$ is then almost nearly 0.

The description above refers to the basic construction of a phase modulation fiber optic gyroscope.

As is evident from equation (18), the amplitudes $E_1$ and $E_2$ of the clockwise and counterclockwise beams are contained in the fundamental components of the output of the light detecting element. Moreover, there is the coefficient $J_1(\xi)$.

For $\Delta\theta$ to be correctly obtainable from such an output, the values $E_1$ and $E_2$ must be stable. However, those values are in fact variable in the conventional system. Especially the amplitudes of $E_1$ and $E_2$ are subject to variation. More specifically, $E_1$ and $E_2$ readily change with the output of the luminous element and the quantity of light passing through the polarizer used to eliminate differences in the light paths or shifts in the position of the optical system. For these reasons, the scale factor of the output of a phase modulation fiber optic gyroscope is generally quite unstable, varying by up to 100% for a conventional signal mode optical fiber.

On the other hand, such variations can be substantially controlled by the introduction of a constant polarizing fiber to determine the direction at which light is incident on the fiber. However, the existing constant polarizing fiber poses problems in terms of the temperature characteristics in the coefficient of extinction. That is, the polarizing state fluctuates with temperature, pressure and distortion while the beams propagate through the fiber, causing the amplitudes $E_1$ and $E_2$ of the light reaching the luminous element and the scale factor to fluctuate by on the order of 15 to 30%.

Consequently, attempts have been to correct for this problem whereby the amplitudes of $E_1$ and $E_2$ are monitored. In such a fiber optic gyroscope, beam splitters are inserted in each of the clockwise and counterclockwise light paths so as to extract portions of the respective light beams and thereby measure the amplitude of $E_1$ and $E_2$. Although this approach may be successful in that the outputs are stabilized, the resulting construction has disadvantages in that the number of parts is increased and in that the quantity of light reaching the light detecting element is reduced, thereby causing a reduction in the S/N ratio.

In order to overcome these problems, the present inventor has devised a method for detecting the d.c. component while the light detecting element is actuated and obtaining sin ($\Delta\theta$) or cos ($\Delta\theta$) by dividing the output of the gyroscope by the d.c. component. However, there has occurred a problem that the S/N ratio is reduced due to a reduced quantity of light reaching the light detecting element.

SUMMARY OF THE INVENTION

Accordingly, an object of the present invention is to provide a phase modulation type fiber optic gyroscope capable of substantially eliminating scale factor fluctuations by monitoring the output light received and holding constant the quantity of light propagating through an optical fiber but in which the quantity of light reaching the light detecting element is not decreased.

A phase modulation fiber optic gyroscope according to the present invention comprises a d.c. component detecting circuit for detecting the d.c. component of an output of the light detecting element, a luminous element output control circuit for controlling the output of the luminous element in response to the output of the d.c. component detecting circuit in such a manner that the d.c. component has a fixed value, at least an optical fiber having a portion forming a sensor coil and another portion wherein a phase modulating element is provided, a luminous element emitting light capable of interference, a beam splitter for splitting the light received from the luminous element and supplying the light beams to both ends of the optical fiber, a light detecting element receiving the light beams propagated through the optical fiber from both ends thereof and combined through the beam splitter, and a synchronous detection circuit for detecting a phase modulation frequency component in response to the output of the light detecting element.

In the phase modulation fiber optic gyroscope thus constructed, the light received from the luminous element is split into two light beams by the beam splitter. The two components propagate through the optical fiber as respective clockwise and counterclockwise beams. One of the clockwise and counterclockwise beams is first processed with phase modulation in the phase modulating element, and the other is then processed therewith. Simultaneously, the rotation to which the sensor coil is subjected causes a phase difference of $\Delta\theta$ between the clockwise and counterclockwise beams. The clockwise and counterclockwise beams that have propagated through the optical fiber are emitted from the optical fiber, combined together by the beam splitter, and made incident on the light detecting element.

The light detecting element generates an electrical signal proportional to the intensity of the light received thereat, whereas the synchronous detection circuit detects the output in such a manner as to extract only a phase modulating frequency component and outputs a corresponding voltage signal.

In response to the output of the light detecting element, the d.c. component detecting circuit detects the intensity of the d.c. component contained therein and supplies the result to the luminous element output control circuit. The luminous element output control circuit controls the output of the luminous element in such a manner as to make constant the output of the d.c. component detecting circuit.

DESCRIPTION OF THE PREFERRED EMBODIMENTS

Figure 1:
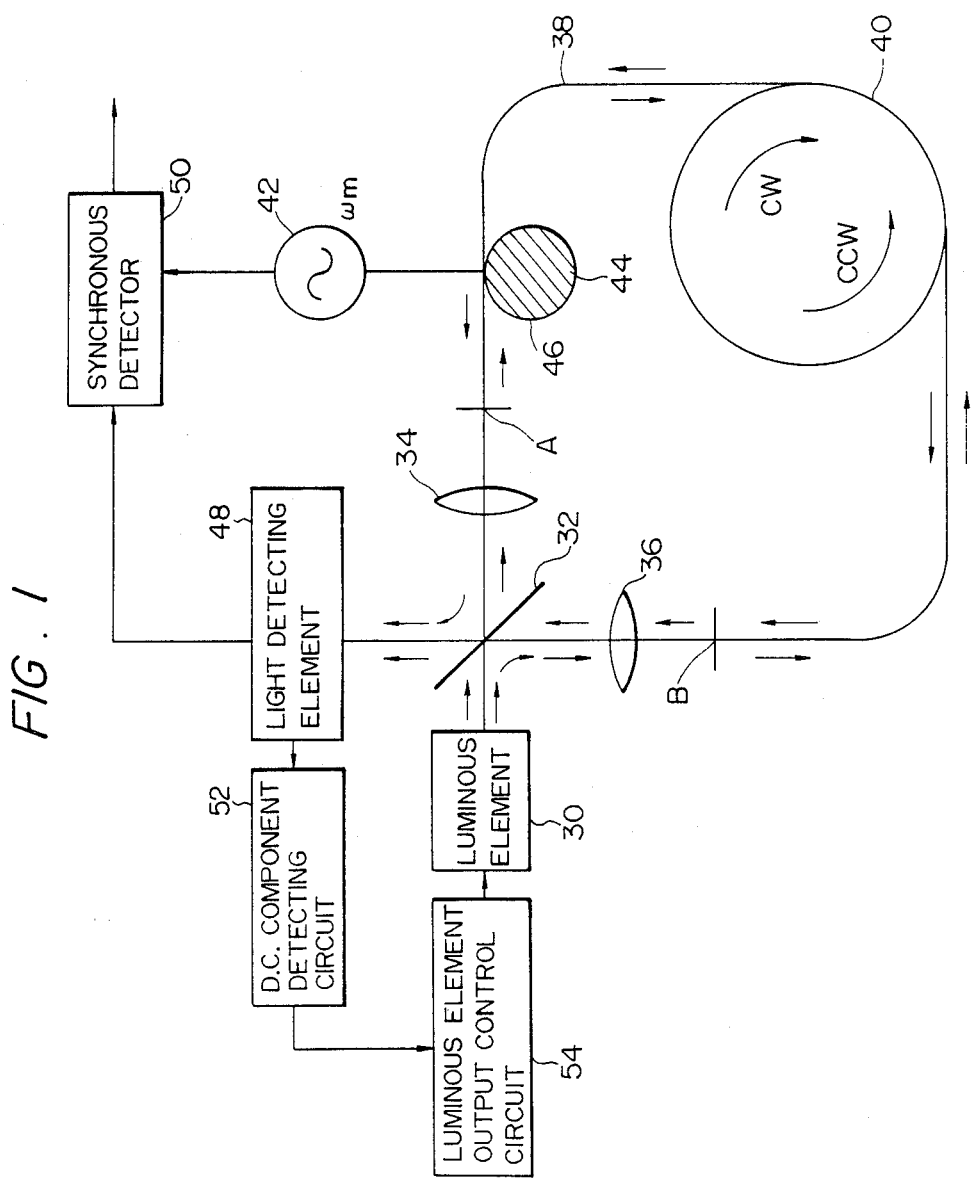
FIG. 1 is a structural view of a phase modulation type fiber optic gyroscope embodying the present invention.
Figure 2:
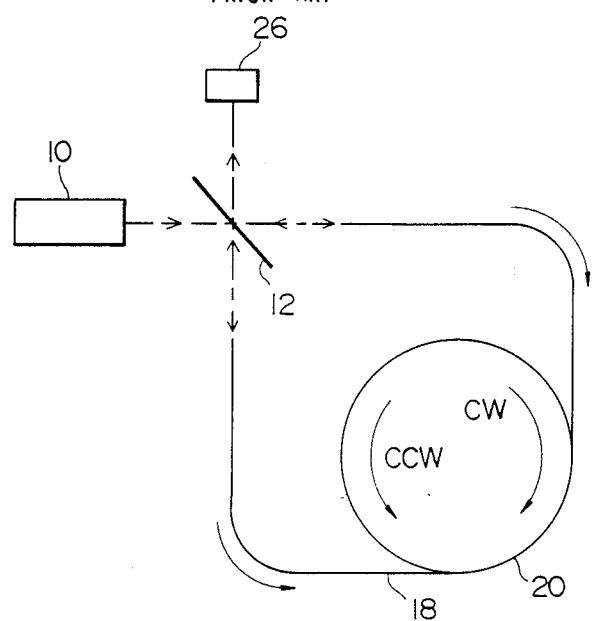
FIG. 2 is a basic structural view illustrating the principles of a fiber optic gyroscope.
Figure 3:
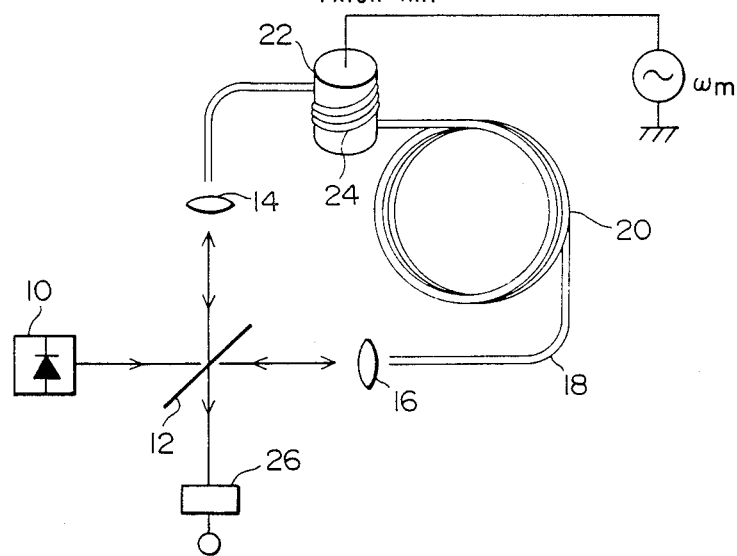
FIG. 3 is a basic structural view illustrating the principles of a phase modulation fiber optic gyroscope.

The above-described signal processing can be analyzed as follows:

Given $E_1$ and $E_2$ = the maximum amplitudes of the clockwise and counterclockwise beams, $\omega_m$ = the modulating angular frequency of the phase modulating element, and b = the modulating amplitude, the amplitude of the component of the fundamental wave $\omega_m$ from the output of the light detecting element can be obtained from equation (18) as follows:

$$2E_1 E_2 J_1(\xi) \cdot \sin(\Delta\theta) \quad (19)$$

From equation (10'), the d.c. component is:

$$(\tfrac{1}{2})(E_1^2 + E_2^2) \quad (20)$$

As set forth above, $\xi$ is often set at 1.8 to maximize $J_1(\xi)$ and, since $J_0(\xi) \approx 0$, the term $J_0(\xi)$ is omitted because of the d.c. component of equation (20).

As the clockwise and counterclockwise beams are made to pass through the same light path, $E_1$ and $E_2$ are proportional. Thus, the relation between the two beams can be expressed by:

$$E_2 = kE_1 \quad (21)$$

where k is a constant of proportionality.

Equations (19) and (20) can be rewritten using equation (21) as follows:

$$2kE_1^2 J_1(\xi) \cdot \sin(\Delta\theta) \quad (19')$$

$$(\tfrac{1}{2})(1+k^2)E_1^2 \quad (20')$$

The d.c. component detecting circuit and the luminous element output control circuit of the phase modulating fiber optic gyroscope according to the present invention are used to control the output of the luminous element so that the value of equation (20') is constant. This is equivalent to making constant the value of $E_1$. As a result, $E_1$ in equation (19') becomes constant and the other quantities are unchanged, except for the change of $\Delta\theta$ due to the Sagnac effect.

In the above-described phase modulation fiber optic gyroscope according to the present invention, the influences of changes in light path conditions caused by changes in the output of the light source and changes of characteristics due to changes in temperature, pressure and distortion of the optical fiber are compensated, whereas the amplitudes $E_1$ and $E_2$ of the clockwise and counterclockwise beams propagating through the optical fiber are held constant. Therefore, variations in the scale factor are effectively eliminated.

As is evident from equation (10'), moreover, equation (20) actually contains a term proportional to $\cos(\Delta\theta)$, and thus $$(\tfrac{1}{2})(E_1^2+E_2^2)+(\tfrac{1}{2})E_1 E_2 J_0(\xi) \cdot \cos(\Delta\theta) \quad (22)$$

In the above-discussed analysis, $J_0(\xi)$ has been ignored because its value and the change in $\cos(\Delta\theta)$ within the range of small scale rotation are insignificant. On the other hand, the change in $\cos(\Delta\theta)$ increases as the range of rotation becomes higher and the influence of that term also becomes significant. However, the effects of the present invention are not changed, and on the contrary new advantageous effects are produced.

In other words, since the phase modulation is detected in the form of the sine of $\Delta\theta$, as indicated by equation (19), a problem occurs in that the linearity in the range of high-speed rotation is reduced, although accuracy is maintained for slower rates of rotation. However, if equation (22) is made constant in the range of high-speed rotation, $\cos(\Delta\theta)$ will decrease. Consequently, the luminous element is so controlled as to make $E_1 E_2$ greater. For that reason, the terms $E_1 E_2$ in equation (19) become greater, and thus the linearity is improved.

Referring to the accompanying drawings, a phase modulating fiber optic gyroscope embodying the present invention will be described.

FIG. 1 is a diagram illustrating an arrangement of the phase modulation fiber optic gyroscope embodying the present invention. The minimum basic construction of a phase modulation type fiber optic gyroscope has been described by S. Ezekiel and H. J. Arditty, "fiber Optic Rotation Sensor", Springer Verlag, Berlin (1982).

In the phase modulation fiber optic gyroscope illustrated, there is provided a luminous element 30 such as a gas or semiconductor laser or a light-emitting diode. Light thereby produced is applied to a beam splitter 32, such as a half-silvered mirror. The beam splitter 32 splits the light beams emitted from the luminous element 30 into transmitted and reflected beams. The light beams thus split are coupled to both ends of an optical fiber 38, such as a constant polarizing optical fiber, through lenses 34 and 36, respectively.

The optical fiber consists of a sensor coil portion 40, wherein the optical fiber is wound a number of times to form a optical fiber sensor, and another portion 46 wherein it is wound on a phase modulating element 44 driven by an a.c. exciting power supply 42 at an angular frequency of $\omega_m$.

The phase modulating element 44, positioned close to either end point A or B of the sensor coil 40, is used to change the light beams passing through the optical fiber periodically. For instance, it may be so arranged that an optical fiber is wound on a cylindrical piezoelectric element and a modulating voltage is applied across the end faces of the element. As the diameter of the piezoelectric element changes with the modulating voltage at the angular frequency $\omega_m$, the optical fiber wound thereon will expand and contract. The length of the light path will thus change and cause the phase to change. Moreover, the modulation factor, as determined by the driving voltage of the a.c. exciting power supply 42, is so set as to satisfy $\xi \approx 1.8$.

The light beams propagated through the optical fiber 38 clockwise and counterclockwise are respectively outputted from the ends of the optical fiber 38 through the lenses 34 and 36, combined by the beam splitter 32, and made incident on a light detecting element 48.

The electrical output of the light detecting element 48 is connected to the input of a synchronous detector 50. A signal at the angular frequency $\omega_m$ is supplied from the exciting power supply 42 to the synchronous detector 50, which synchronously detects the output of the light detecting element 48 at the angular frequency of $\omega_m$ and outputs a voltage signal indicating the frequency $f_m$.

In addition, the output of the light detecting element 48 is also supplied to the d.c. component detecting circuit 52. The d.c. component detecting circuit 52 is composed of, for instance, an amplifier receiving and amplifying the output of the light detecting element and an integrating circuit receiving the output of the amplifier and operating to extract the d.c. component in the output of the light detecting element and apply a voltage signal to a luminous element output control circuit 54.

The luminous element output control circuit 54 compares the voltage signal from the d.c. component detecting circuit 52 with a reference voltage and control the output of the luminous element 30 in such a manner as to make constant the voltage signal from the d.c. component detecting circuit 52.

The phase modulation fiber optic gyroscope thus constructed operates as follows:

Light beams from the luminous element 30 are split into two parts by the beam splitter 32 and coupled to the two ends of the optical fiber 38 through lenses 34 and 36.

There develops a phase difference between the light beams inputted to the optical fiber 38 in the portion where the sensor coil 40 has been rotated, whereas the phase is modulated in the portion 46 wherein the optical fiber has been wound on the phase modulating element 44 driven by the a.c. exciting power supply 42 at the angular frequency $\omega_m$.

The clockwise and counterclockwise beams with the phase difference therebetween and subjected to phase modulation in the optical fiber 38 are outputted from the ends of the optical fiber 38 through the lenses 34 and 36, respectively, combined by the beam splitter 32, and made incident on the light detecting element 48.

The electrical output of the light detecting element 48 is inputted to the synchronous detector 50 supplied by the a.c. exciting power supply 42 with the driving angular frequency $\omega_m$ of the phase modulating element 44 as a reference frequency. The synchronous detector 50 synchronously detects the input signal at the angular frequency $\omega_m$ to produce a signal component having the angular frequency $\omega_m$, i.e., a signal having the form $2E_1E_2J_1(\xi) \cdot \sin(\Delta\theta)$. In other words, there is produced a voltage signal indicating the phase difference $\Delta\theta$ generated in the sensor coil 40.

In response to the output of the light detecting element 48, the d.c. component detecting circuit 52 applies a voltage signal indicating the d.c. component to the luminous element output control circuit 54. The luminous element output control circuit 54 compares the input voltage signal with a reference voltage and, when the input voltage signal is smaller than the reference voltage, increases the luminous element 30 driving voltage to make the output of the luminous element greater, while making the output of the luminous element smaller by decreasing the luminous element 30 driving voltage when it is larger than the reference voltage. The luminous element 30 is thus controlled by the luminous element output control circuit 54 so that the d.c. component expressed by equation (20'), or more specifically, equation (21), is made constant.

As set forth above, the phase modulation fiber optic gyroscope acts to compensate for fluctuations in the intensity of light propagating through the optical fiber, the fluctuations being caused, for instance, by changes of temperature or by changes in power supply voltage. Thus, the quantity of propagating light can be made constant. Accordingly, the scale factor of the output of the phase modulation type fiber optic gyroscope is prevented from fluctuating and the measurement reliability is improved.

A phase modulation type fiber optic gyroscope according to the present invention and conventional gyroscopes of the same general type were compared as follows: When a constant polarizing fiber was employed as an optical fiber in a conventional phase modulation fiber optic gyroscope, there occurred 15 to 30% scale factor fluctuations due to temperature fluctuations, etc. On the contrary, use of the constant polarizing fiber for the phase modulation fiber optic gyroscope according to the present invention resulted in scale factor fluctuations of 1% or lower.

As is believed evident from the above description, the phase modulation type fiber optic gyroscope according to the present invention is capable of practically eliminating scale factor fluctuations by holding constant the quantity of light propagating through an optical fiber without reducing the quantity of light arriving at a light detecting element. Thus, correct and stable measurement becomes possible.

What is claimed is:

1. A d.c. controlled phase modulation fiber optic gyroscope comprising: an optical fiber (38) having a portion forming a sensor coil (40) and another portion wherein a phase modulating element (44) is provided, a luminous element (30) emitting light capable of interference, a beam splitter (32) for splitting light received from said luminous element and supplying the resulting split light beams to both ends of said optical fiber, a light detecting element (48) for receiving the light beams propagated through said optical fiber from both ends thereof and combined through said beam splitter, said light detecting element receiving the entire quantity of light emitted from said luminous element, a synchronous detection circuit (50) for detecting a phase modulation frequency component in response to an output of said light detecting element, and means for compensating for fluctuations in the intensity of the light beams propagating through said optical fiber, said compensating means comprising a d.c. component detecting circuit (52) for detecting a d.c. component in an output of said light detecting element, and a luminous element output control circuit (54) for controlling the output of said luminousm element in response to the output of said d.c. component detecting circuit so that said d.c. component is held constant.

2. The fiber optic gyroscope as claimed in claim 1, wherein said d.c. component detecting circuit comprises an amplifier receiving and amplifying the output of said light detecting element and an integrating circuit receiving the output of said amplifier.

3. The fiber optic gyroscope as claimed in claim 1, wherein said optical fiber comprises a constant polarization optical fiber.

* * * * *